(12) United States Patent
Turner et al.

(10) Patent No.: US 7,222,613 B2
(45) Date of Patent: May 29, 2007

(54) FUEL DELIVERY SYSTEM

(76) Inventors: Geoffrey Russell Turner, 118 Palm Avenue, Leeton, New South Wales 2705 (AU); Andrei Vadimovitch Shinkarenko, 147 Rosia Rd., Park Ridge South QLD 4125 (AU); James Richard Hunt, 53 Harrison St., Maryville 2293 (AU)

( * ) Notice: Subject to any disclaimer, the term of this patent is extended or adjusted under 35 U.S.C. 154(b) by 78 days.

(21) Appl. No.: 10/523,930

(22) PCT Filed: Jul. 31, 2003

(86) PCT No.: PCT/AU03/00971

§ 371 (c)(1),
(2), (4) Date: Oct. 14, 2005

(87) PCT Pub. No.: WO2004/018862

PCT Pub. Date: Mar. 4, 2004

(65) Prior Publication Data

US 2006/0124112 A1 Jun. 15, 2006

(30) Foreign Application Priority Data

Aug. 23, 2002 (AU) .............................. 2002950972

(51) Int. Cl.
*F02M 21/02* (2006.01)
(52) U.S. Cl. .................. 123/525; 123/527; 123/27 GE
(58) Field of Classification Search ................. 123/525, 123/527, 27 GE, 516, 470
See application file for complete search history.

(56) References Cited

U.S. PATENT DOCUMENTS

| 5,076,244 A | * | 12/1991 | Donaldson .................. 123/527 |
| 5,479,906 A | | 1/1996 | Collie |
| 5,887,574 A | * | 3/1999 | Smith ......................... 123/527 |
| 6,267,104 B1 | | 7/2001 | Monnier |
| 2001/0003977 A1 | | 6/2001 | Hayashi et al. |

FOREIGN PATENT DOCUMENTS

| WO | WO 89/00640 | 1/1989 |
| WO | WO 89/04920 | 6/1989 |
| WO | WO 96/35863 | 11/1996 |
| WO | WO 02/081895 A1 | 10/2002 |

OTHER PUBLICATIONS

International Search Report of PCT/AU03/00971.

* cited by examiner

*Primary Examiner*—Stephen K. Cronin
*Assistant Examiner*—Hyder Ali
(74) *Attorney, Agent, or Firm*—Foley & Lardner LLP

(57) ABSTRACT

A fuel delivery system for an engine is disclosed which includes an injector (20) and a housing (3) for supporting a fuel injector (20). A regulator (202, 313) is provided for regulating the pressure of fluid in the housing to maintain the pressure at about supply pressure, and the pressure downstream of the regulator at a low pressure so that fuel which passes the regulator is able to evaporate. The evaporated fuel is supplied to a heater (250) to heat the fuel, and the vapour is supplied to a vapour injector (260) for injection into the engine. The passage of the liquid petroleum gas fuel through the housing (3) cools the injector (20) to maintain the fuel in a liquid state, and therefore prevent boiling of the vapour within the injector.

25 Claims, 6 Drawing Sheets

FUEL DELIVERY SYSTEM

FIELD OF THE INVENTION

This invention relates to a fuel delivery system and, in particular, to a fuel delivery system for delivering liquid gas such as liquid petroleum gas, together with diesel fuel to a diesel engine.

BACKGROUND ART

Our co-pending International Application No. PCT/AU02/00453 discloses a fuel delivery system of the above-mentioned type, which successfully enables a diesel engine to run on both diesel fuel and liquid petroleum gas. The contents of this International application is incorporated into this specification by this reference.

SUMMARY OF THE INVENTION

The object of the present invention is to provide further improvements to the fuel delivery system to further increase fuel economy and also to decrease emissions.

The invention may be said to reside in fuel delivery system for an engine including:
 a liquid injector for receiving liquid gas and for ejecting liquid gas in liquid form to the cylinders of an engine;
 means for preventing vaporisation or bubbling of the liquid gas in the liquid injector so the liquid gas is ejected from the injector in liquid form;
 collection means for collecting vaporised liquid gas;
 a bleed injector for delivering the collected liquid gas vapour to the cylinder of the engine; and
 wherein the system includes liquid gas supply means for supplying liquid gas for ejection by the injector, the collection means comprises a debubbling chamber in which bubbled or vaporised liquid gas is collected, the injector being located in the chamber so that the collected vapour facilitates cooling of the injector, and a vapour supply line for supplying vapour from the chamber to the bleed injector.

The use of both the liquid injector and the bleed injector to deliver liquid gas in liquid form and liquid gas in vapour form to the engine allows both injectors to be operated so that the liquid gas is delivered only when the inlet valve of the cylinder is open and the exhaust valve of that cylinder is closed, thereby reducing blow-through of fuel and decreasing emissions. Since the supply of vapour is controlled in this manner, the blow-through of the vapour is prevented so that the vapour is actually used as fuel in the engine, thereby increasing power and decreasing unwanted emissions which would otherwise be created if the vapour simply blows through the engine or is not correctly combusted in the engine due to the timing of the delivery of the vapour into the cylinder.

Preferably the system includes a controller for supplying injection pulses to the liquid injector and injection pulses to the bleed injector so that liquid gas in liquid form and liquid gas in vapour form is supplied only when the inlet valve of the cylinder is open and the exhaust valve of the cylinder is closed.

Preferably the bleed injector is sized and the injection pulses applied to the bleed injector are of such a length to control the amount of liquid gas in vapour form which is delivered from the bleed injector to the cylinder of the engine.

Preferably a bleed gas heater is provided for heating the vapour before the vapour is supplied to the bleed injector to ensure that the liquid gas supplied to the bleed injector is supplied in vapour form for ejection by the bleed injector.

Preferably the bleed gas heater comprises a heater housing for receiving heated fluid, and a bleed line passing through the heater housing for delivering the vapour to the bleed injector.

The heated fluid may comprise engine cooling water. However, other heated fluid could be used, such as exhaust gases.

In the preferred embodiment of the invention the controller comprises the engine control unit of the engine which produces injection pulses for delivery to both the liquid injector and the bleed injector in accordance with engine operating conditions.

The pulse supplied to the bleed injector may, depending on the size of the injector, be the same width as the pulse supplied to the liquid injector, or could be a different width depending on the size of the bleed injector.

Preferably the collecting means comprises cooling means for cooling the liquid injector to prevent bubbling or vaporisation of the liquid gas when in the injector.

Preferably the cooling means includes a housing in which the injector is supported, an inlet in the housing for receiving bubbled liquid gas, and for enabling the bubbled liquid gas to surround the injector in the housing to cool the injector to thereby maintain the liquid gas in the injector in a liquid state, outlet means from the housing for supplying vapour from the housing to the bleed injector.

Preferably the bleed gas heater is arranged between the outlet means from the housing and the bleed injector.

Preferably the housing includes a pressure regulator for regulating the pressure of the vapour in the housing.

Preferably the pressure regulator comprises a diaphragm, a valve element supported by the diaphragm for closing the inlet, and biasing means for biasing the diaphragm and the valve element towards a closed position, so that when pressure builds up within the housing, the diaphragm is forced against the bias of the biasing means to move the valve element into a closed position, and when pressure reduces in the housing, the biasing means biases the diaphragm to move the valve element to open the inlet.

The invention also provides a fuel delivery system for delivering liquid gas to a cylinder of an engine, comprising:
 a housing;
 a chamber in the housing for receiving an injector which includes a lower opening for enabling liquid gas to be supplied to the injector for ejection from the injector;
 a liquid gas inlet communicating with a lower portion of the chamber for introducing liquid gas into the chamber adjacent the lower portion of the injector when the injector is installed in the chamber;
 an outlet from the chamber arranged in an upper portion of the chamber; and
 a pressure regulator for regulating the pressure of the vapour within the chamber.

According to this invention, the liquid fuel is able to enter the chamber from a lower portion of the chamber and flow into the inlet opening of the injector. Any fuel which converts to a bubble or vapour state is able to flow around the injector towards an upper portion of the chamber and exit through the upper outlet from the chamber. The regulator can therefore maintain the pressure within the chamber at about the tank pressure of the fuel which is supplied to the injector, but downstream of the regulator, the pressure can be greatly reduced to, amongst other things, enable the fuel to evaporate. The flow of the liquid gas into the housing, through the chamber and then through the outlet maintains the housing in a cold state, and also the injector in a cold state so the formation of bubbles or vapour within the housing is minimised so liquid petroleum gas is present for delivery to the injector and for ejection from the injector.

Preferably the housing is in the form of a block and the chamber comprises a bore in the block.

Preferably the pressure regulator regulates the pressure within the chamber so as to maintain the pressure within the chamber at about the pressure of supply of the liquid gas from a supply tank, and the pressure downstream of the pressure regulator at a relatively low pressure compared to the pressure in the injector chamber.

Preferably the pressure regulator has an outlet passage which passes through the block in the form of a labyrinth to further facilitate cooling of the block, and therefore the maintenance of liquid gas in the block in a liquid state.

Preferably the inlet comprises an inlet passage through the block, the inlet passage having a filter cavity for receiving a filter so the liquid gas passes through the filter before delivery to the chamber.

Preferably the pressure regulator comprises:
a seat;
a seal for seating on the seat;
a piston for moving the seal to sit on the seat;
a first regulator chamber having a first diaphragm having a first area;
a second regulator chamber having a second diaphragm having a second area greater than the first area;
a communication passage for communicating the first chamber with the second chamber; and
wherein when the pressure in the injector chamber increases to a predetermined amount, the seal is forced away from the seat so vapour and bubble mixture can enter the first chamber and pass into the second chamber through the passage, and because of the differential area between the first diaphragm and the second diaphragm, when the pressure in the first and second chambers reaches a predetermined level, the force on the second diaphragm is greater than the force on the first diaphragm, thereby causing the first and second diaphragms to move to force the piston and therefore the seal against the seat to thereby regulate the pressure in the injector chamber.

Preferably the first diaphragm is sandwiched between the piston and a retainer, the retainer and piston having a hole for receiving a screw, the second diaphragm being provided on a side of the retainer opposite the first diaphragm, and the communication passage comprising a bore through the piston and a bore through the screw.

In a second embodiment, the pressure regulator comprises:
a seat;
a plunger having a head, the head being locatable against the seat, the plunger further having a stem;
a regulator chamber, a diaphragm forming a wall of the chamber;
biasing means for biasing the diaphragm so as to push the plunger so the head is away from the seat; and
wherein when pressure builds up in the injector chamber, the pressure within the injector chamber and regulator chamber forces the diaphragm away from the plunger against the bias of the biasing means so the plunger can be moved so the head seats on the seat.

Preferably the outlet communicates with the regulator chamber for bleeding vapour and bubble mixture in the chamber out of the regulator chamber, so that when the pressure in the regulator chamber decreases, the biasing means biases the plunger away from the seat so the vapour and bubble mixture in the injector chamber can again enter the regulator chamber to force the diaphragm away from the plunger so the plunger can close to shut off the chamber to thereby regulate the pressure within the injector chamber.

Preferably the diaphragm includes a boss for engaging the plunger.

Preferably the biasing means comprises a spring and the spring is connected to a screw threaded stem so that the bias supplied by the spring can be adjusted by screw thread adjustment of the screw threaded stem.

In the preferred embodiment of the invention, the pressure regulator regulates the pressure of the vapor within the chamber and also downstream of the regulator so that the pressure within the chamber is maintained at a relatively high pressure, and the pressure downstream of the regulator is at a relatively low pressure so that vapor and bubble mixture which enters the low pressure environment on the downstream side of the regulator can vaporise for delivery to the engine by a vapor bleed injector.

BRIEF DESCRIPTION OF THE DRAWINGS

A preferred embodiment will be described by way of example with reference to the accompanying drawings, in which.

DESCRIPTION OF THE PREFERRED EMBODIMENT

Figure 1:
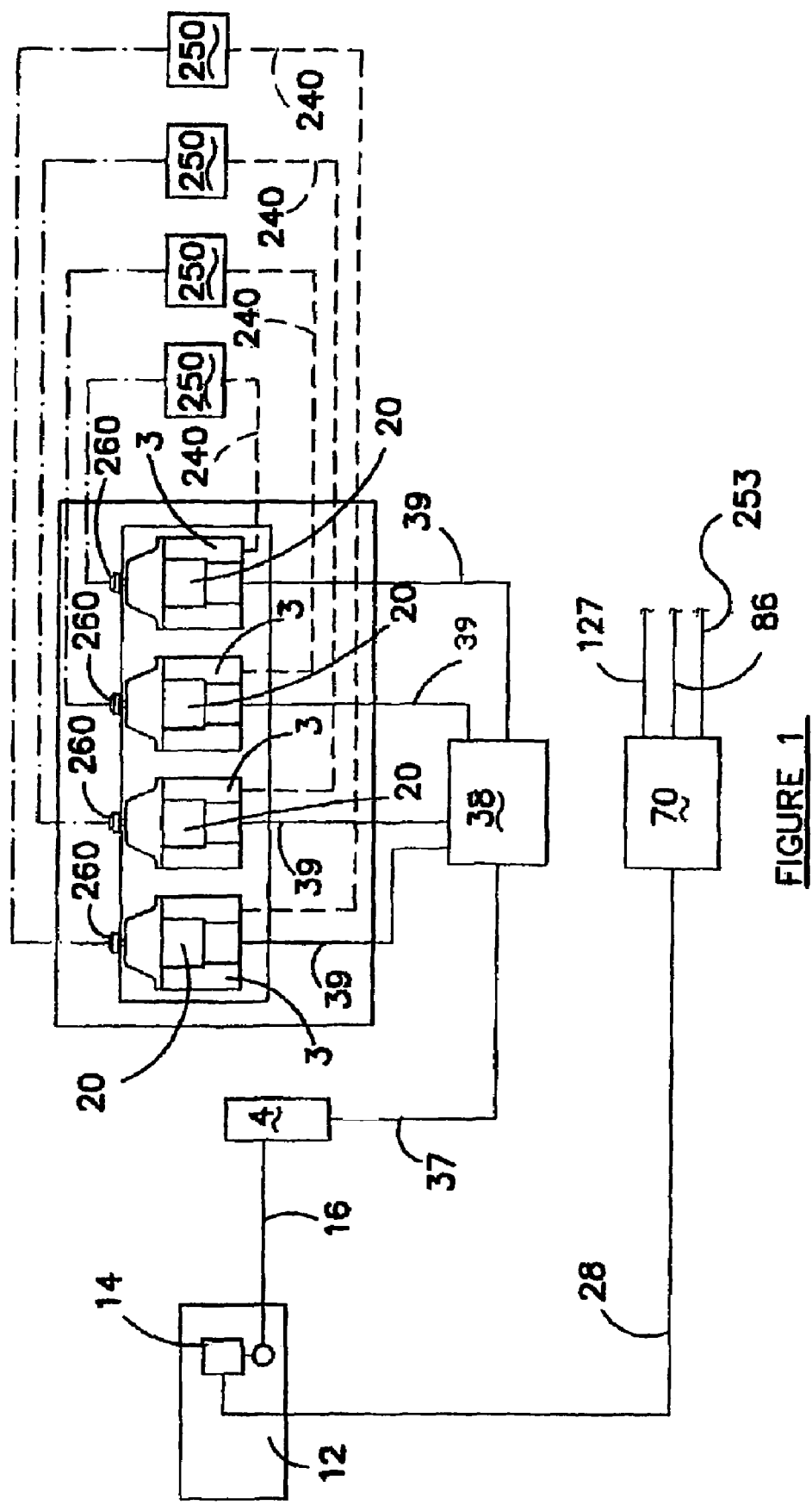
FIG. 1 is a schematic diagram of the preferred embodiment of the invention.

With reference to FIG. 1 liquid petroleum gas tank 12 supplies liquid petroleum gas via tank lock 14 to service line 16 and onto inline filter 4, the filtered liquid petroleum gas is then conveyed through service line 37 to distribution block 38. From the distribution block 38 the liquefied petroleum gas liquid flows through insulated delivery lines 39 to injector housings 3 (shown in more detail in FIGS. 2 and 3).

Figure 2:
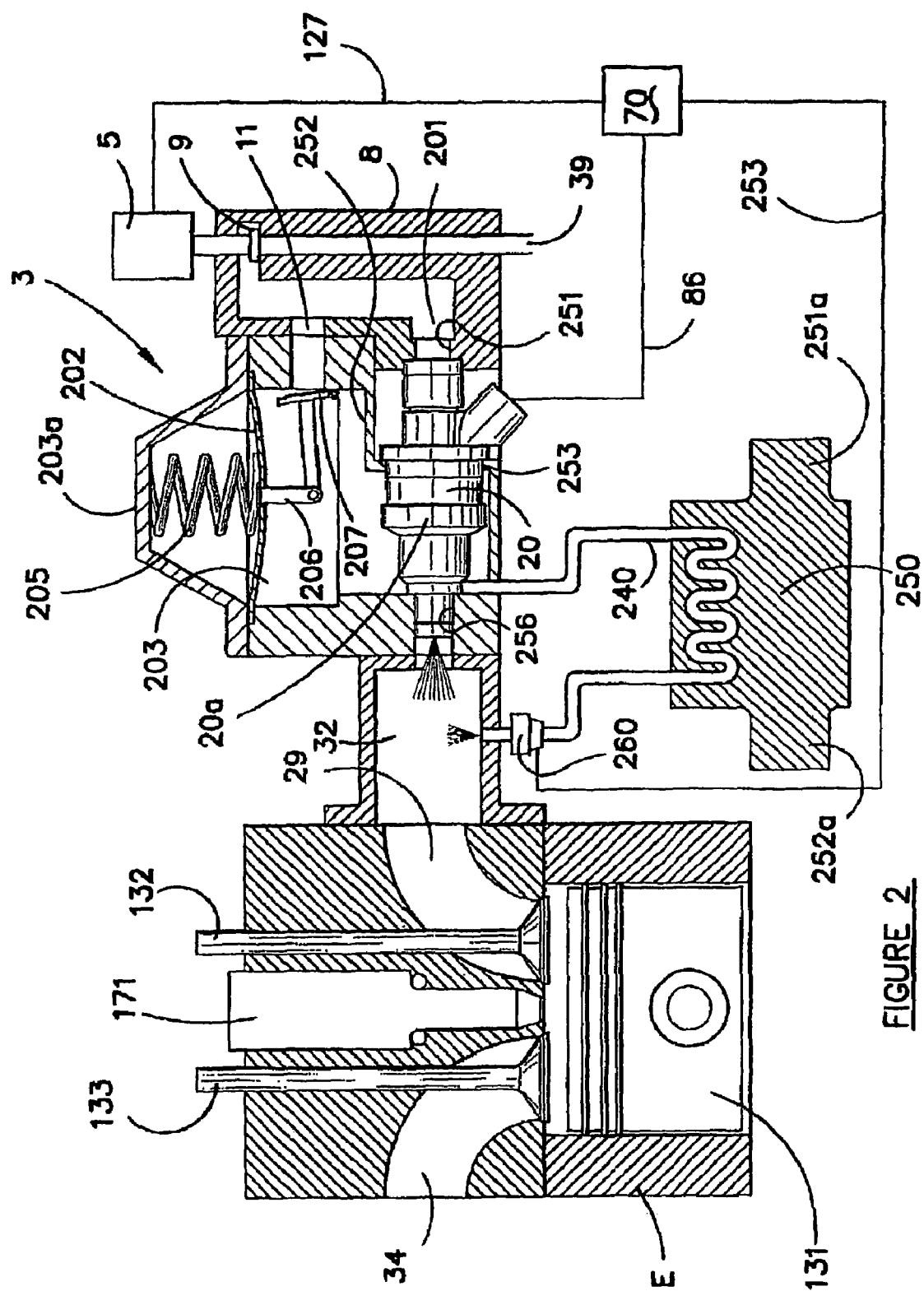
FIG. 2 is a detailed view of the preferred embodiment of the invention.

With reference to FIG. 2 the liquefied petroleum gas from lines 39 enter respective weir T pieces 8 of each housing 3. The liquefied petroleum gas flows upwards towards stop valve 9 which is controlled by stop valve solenoid 5. Stop valve solenoid 5 is open when energised by ECU 70 on circuit line 127.

When stop valve 9 is open liquefied petroleum gas liquid and vapour bubbles flow through stop valve 9 with the liquid dropping via gravity to injector inlet 201 and the bubbles rise to converter inlet 11.

As is apparent from FIG. 2, the injector housing 3 supports the injector 20 and also acts to draw away the bubbles from the injector inlet 201. The injector housing 3 also provides cooling of the injector 20 so as to maintain the fuel in the injector 20 in the liquid state and thereby prevents the fuel from converting into a boiling or bubble state while in the injector 20.

Figure 3:
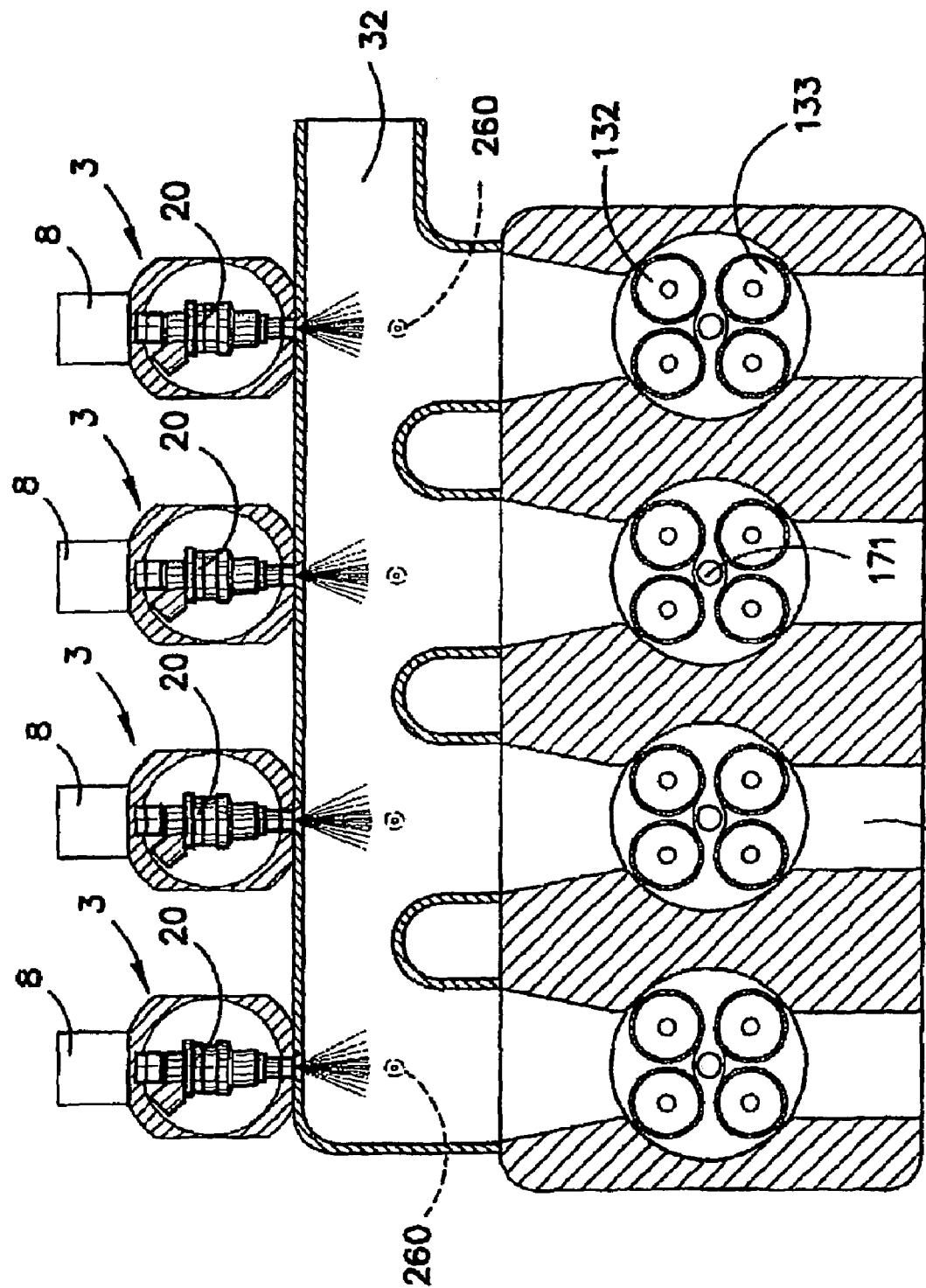
FIG. 3 is a top cross-sectional view showing four injection devices correctly aligned with the inlet ports of the cylinder head and attached to the inlet manifold according to the preferred embodiment of the invention.

With liquid at injector inlet 201 and a pulse width supplied from ECU 70 to injector 20 the liquid liquefied petroleum gas travels through the injector 20 and is ejected into manifold 32 (see FIG. 3), with the spray directed towards inlet port 29 (see FIG. 3). The injection of the liquefied petroleum gas is timed by the ECU 70 such that the pulse occurs after the closing of exhaust valve 133 (see FIG. 3) and before the closing of the inlet valve 132 (see FIG. 3), such that the downward action of piston 131 (see FIG. 3) can draw into engine E, all of the liquefied petroleum gas ejected with no blow-by passed exhaust valve 133.

As the liquefied petroleum gas drops over weir T piece 8 for supply of liquefied petroleum gas to injector inlet 201 any vapour bubbles present or formed rise to converter inlet 11 for pressure reduction in chamber 203 within the housing 3. The housing 3 has a cap portion 203a which is closed by a diaphragm 202. The diaphragm 202 forms one wall of the chamber 203 and the diaphragm 202 is biased inwardly of the chamber 203 by a spring 205. The diaphragm 202 carries a lever 206 which connects to a flat valve 207 which seals the inlet 11, dependent upon the pressure in the chamber 203. As is apparent from FIG. 2, the injector 20 is mounted in the chamber 203 and has an inlet 201 supported on a flat 251 and its mid-portion 20a sealed in wall structure 252 and 253 of the chamber 203. The outlet end of the injector 20 is sealed in bore 256 in the chamber 3 which is exposed to the inlet manifold 32 of the engine E.

The liquefied gas supplied through the weir T piece 8 to the inlet 11 is at a significantly higher pressure than the interior of the chamber 203, which pushes the valve 207 open against the diaphragm 202 and biases the spring 205, so that bubbles and vapour which occur in the liquid gas supplied to the inlet 201 will rise and flow into the inlet 11 and into the chamber 203. The reduced pressure within the chamber 203 allows the bubbles to collapse and with any liquid which enters the chamber 203, to turn to vapour thereby cooling the injector 20 which is exposed to the chamber 203. This cooling of the injector 20 ensures that the liquid petroleum gas which enters the inlet 201 is maintained in a liquid state because of the cold state of the injector 20, and does not convert to vapour in the injector 20, which would impair operation of the injector 20 and prevent proper ejection of fuel from the injector 20. Should the pressure in the chamber 203 rise to a pressure above the liquid petroleum gas at the inlet 11, the diaphragm 202 is pushed upwardly in FIG. 2 against the bias of the spring 205, which causes the lever 206 to close the flat valve 207 against the inlet to prevent further entry of bubbles and vapour into the housing 203 until the pressure in the housing 203 has decreased by egress of liquid petroleum gas from the housing 203 via outlet conduit 209. Thus, the reduced pressure vapour and liquid in chamber 203 has a cooling effect on the housing 3 and injector 20.

The liquefied gas in the housing 203, which can be in a vapour or liquid state, leaves the housing 203 through conduit 240. The conduit 240 passes through a bleed gas heater 250. The bleed gas heater 250 has an inlet 251a and an outlet 252a which can be connected in an engine cooling water conduit so that engine cooling water which is at a temperature of about 70° C. passes through the heater 250 to supply heat to the heater 250 and, in particular, heat to the part of the conduit 240 which is inside the heater 250. Thus, any liquid gas which passes through the conduit 240 is heated and therefore converts to a vapour state if not already in a vapour state. The conduit 240 is connected to a bleed injector 260 which is designed to eject gas rather than liquid, and the injector 260 injects vapour into the inlet manifold 32, as is shown in FIG. 2. The bleed injector 260 is controlled by the ECU 70 via pulses received on line 253. The pulses on the line 253, like the pulses on line 86, are timed such that the injector 260 is actuated when the inlet valve 132 is open and the exhaust valve 133 is closed, so that the liquid petroleum gas in vapour state is supplied to the engine E together with the liquid ejected from the injector 20. Thus, the supply of the vapour is controlled in the same manner as the liquid supply and therefore blow-through of vapour through the engine is prevented or at least greatly reduced. The injectors 260 are sized and the pulses supplied on line 253 of such a length that the desired amount of gas is injected into the engine such that emissions are not adversely affected and, at the same time, the cooling effect provided by the passage of liquid gas through the inlet 11, the housing 203 and the conduit 240 does not adversely affect the cooling of the injector 20.

The bleed gas heater 250 ensures that no liquid gas in the liquid state reaches the bleed injector 260, as this would alter the mixture due to the fuel density difference between liquid and gaseous liquid petroleum gas.

The heat supplied by the bleed gas heater 250 is preferably sufficient to ensure that the temperature is well above the liquid petroleum gas vaporisation point and relatively stable.

FIGS. 2 and 3 also show diesel injector 171 for supplying diesel fuel to the cylinder of the engine E concurrently with the supply of liquid petroleum gas via the injector 20 and the injector 260. Thus, by supplying fuel in the form of liquid petroleum gas from the injectors 20 and 260, the amount of diesel fuel which is required can be reduced, thereby increasing fuel economy compared to situations which would occur when only diesel fuel is supplied via the diesel injector 171. Furtherstill, by ensuring that the liquid gas which is bubbled off in the housing 203 and used to cool the injector 20 is again delivered to the engine in the form of vapour during the cycle of the engine when the exhaust valve 133 is closed and the inlet valve 132 is open, ensures that that fuel is efficiently used thereby increasing power, which means that not so much throttle pressure is required, thereby further reducing fuel. The fact that the fuel is supplied in this manner also prevents blow-through, which would not only waste the fuel, but also may well increase emissions to an undesirable level.

Figure 4:
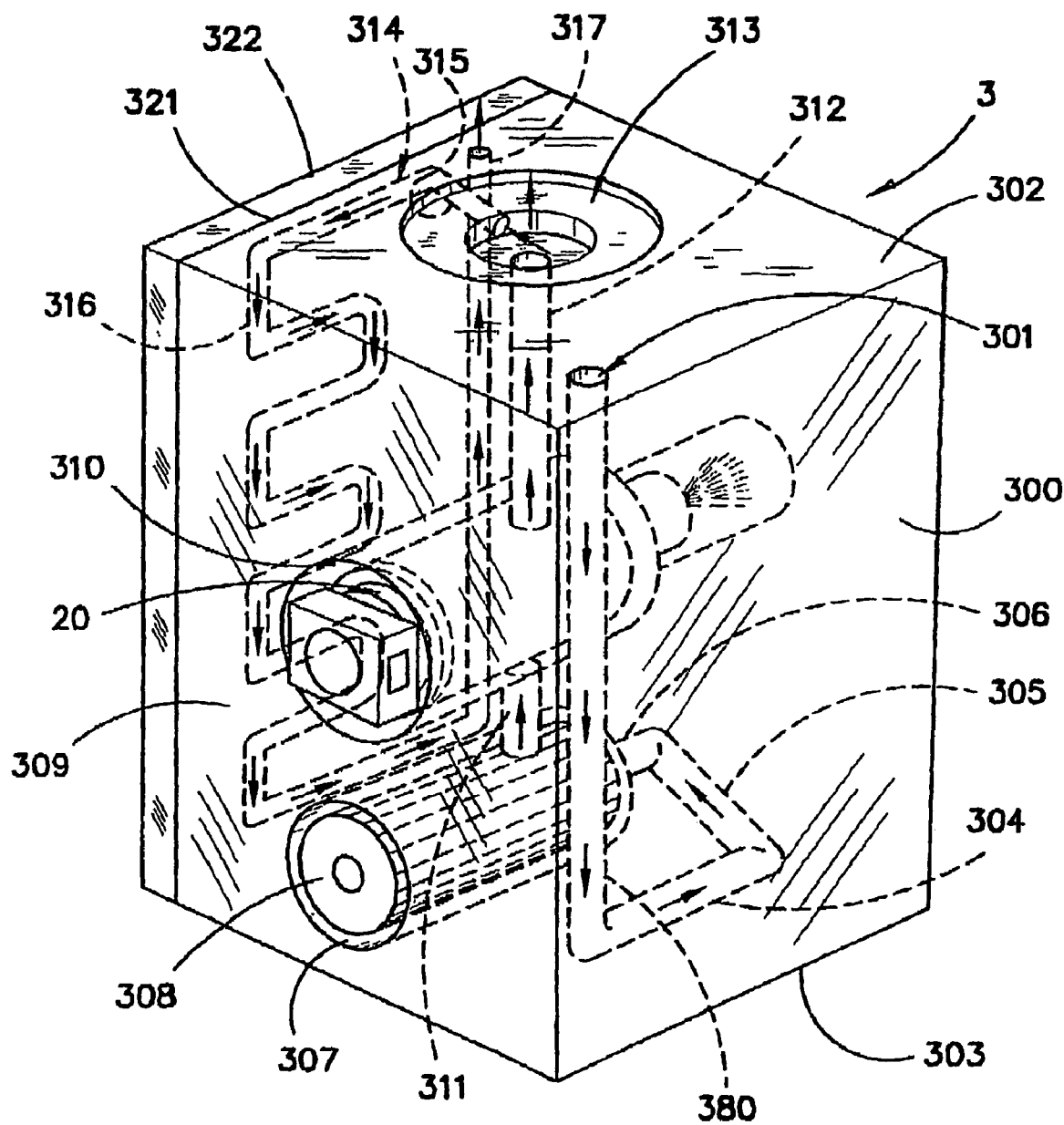
FIG. 4 is a perspective view of another embodiment of the invention.

FIG. 4 shows a second embodiment of the invention in which the injector housing 3 of the embodiment of FIGS. 1 and 2 has been modified.

As shown in FIG. 4, the housing 3 is in the form of a block 300 formed from metal such as aluminium. The block 300 has an 1 pg inlet 301 which passes from upper surface 302 of the block to injector chamber 310. The inlet 301 connects to the respective line 39 described with reference to FIGS. 1 to 3. The inlet 301 is made up of a bore 380 which extends from surface 302 in a position within the block just below lower surface 303. The inlet 301 has a first transverse bore 304 and the transverse bore 304 joins with a second transverse bore 305 which in turn joins a third transverse bore 306. The transverse bore 306 communicates with a filter cavity 307 in which a filter 308 is located. The cavity 307 is formed by a large diameter bore in the face 309 of the block 300.

The injector chamber 310 is also formed in the block 300 by a large diameter bore which is made through the face 309.

The inlet 301 has an inlet bore 311 which extends from an upper portion of the cavity 307 into a lower portion of the injector chamber 310. The injector chamber 310 has a passage 312 which extends from an upper portion of the chamber 310 to a bleed regulator 313. The regulator 313 has an outlet 314 which comprises a first outlet bore 315 which joins a labyrinth passage 316 which passes through the block 300. The labyrinth passage 310 joins an outlet bore 317 which couples to the conduit 240 described with reference to FIGS. 1 to 3.

The various parts of the inlet passage 301 and the outlet passage 314 are formed by drilling bores in the block and blocking the bores where necessary by dowels (not shown) or by forming the bores in a surface 321 of the block 300, and then closing the surface with a cover plate 322. A cover plate (not shown) may also be used to close the face 309 to securely locate the filter 308 within the filter cavity 307 and the injector 20 within the chamber 310.

Figure 5:
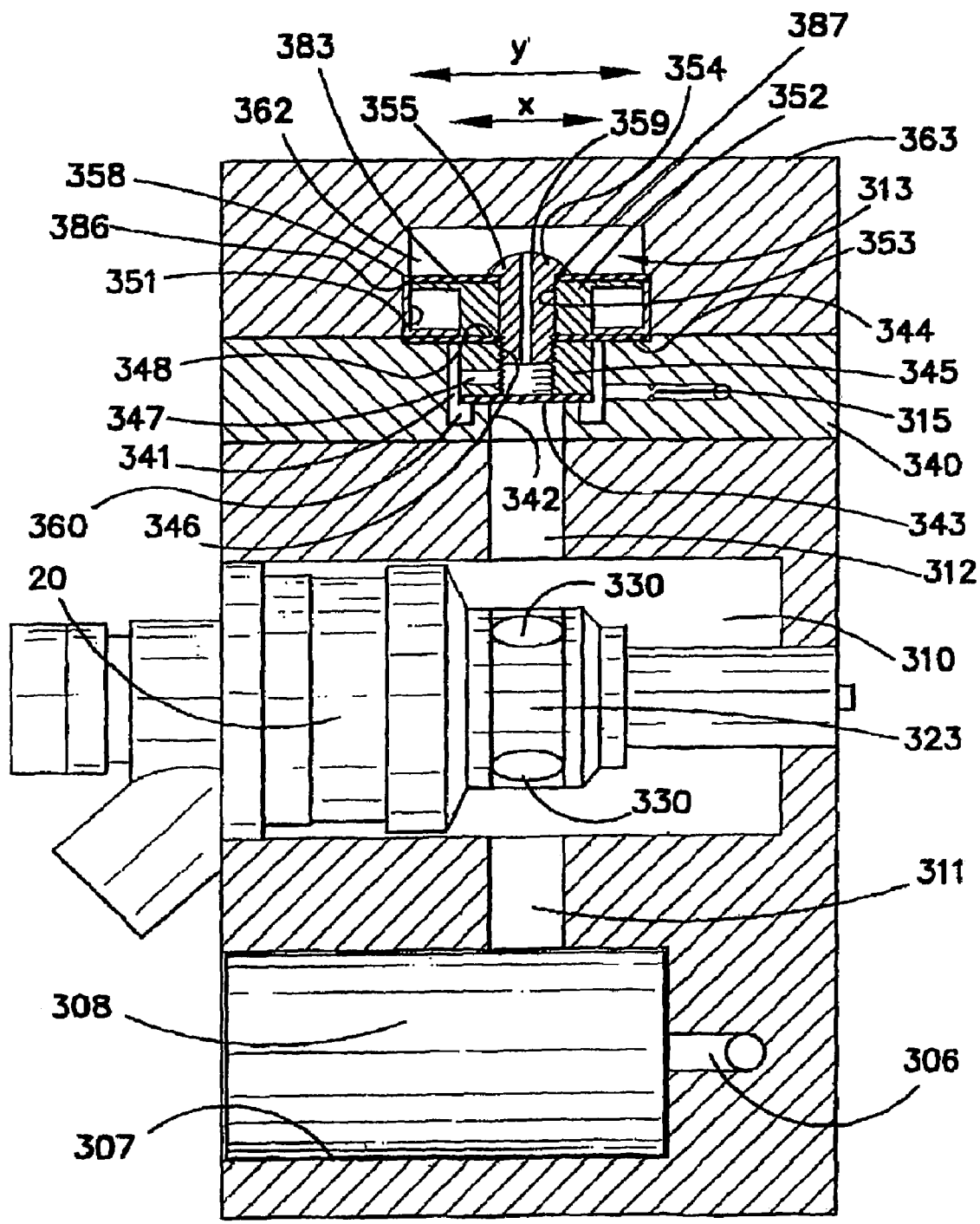
FIG. 5 is a cross-sectional view of the embodiment of FIG. 4.

FIG. 5 is a cross-sectional view through the block 303 with only part of the inlet passage 306 and outlet passage 315 shown for ease of illustration. As can be best seen in FIG. 5, liquid petroleum gas is delivered through the inlet bore 306 into the interior of the filter 308. The liquid petroleum gas is under high pressure and passes through the filter 307 and up through inlet bore 311 into chamber 310. Injector 20 is located in chamber 310 and is a commercially available injector which includes a plurality of inlet orifices 330 about its periphery. The orifices 330 are arranged so that they are generally in alignment with the inlet stem 311 so that liquid petroleum gas in a liquid state can enter the lowermost orifice 330 for ejection from the injector 20. Any liquid petroleum gas which converts to vapour state or bubbles in the vicinity of the inlet bore 311 and chamber 310 will generally flow around the injector 20 towards the upper part of the chamber 310 and into outlet bore 312. The injector 20 is provided with a gauze covering 323 about the orifices 330 which also facilitates in movement of the bubbles around the periphery of the injector 20 and not into the orifices 330. Thus, the fuel which enters the injector 20 is in the liquid state ready for injection and not vapour or bubbles which may be form and which, if they entered the injector 20, would impair operation of the injector 20. The outlet bore 312 communicates with regulator 313 to maintain pressure within the chamber 310. However, as the pressure in the chamber 310 and bore 312 increase, the regulator 313 is opened to enable the liquid petroleum gas in vapour or bubble state to pass through the regulator 313 to outlet passage 315, and then through the labyrinth 316 to outlet passage 317 and then to the heater 250 for supply to the engine in vapour state, as previously described with reference to FIGS. 1 to 3.

The regulator 313 therefore serves to maintain a high pressure region in the chamber 310 which connects back through inlet bore 301 to tank 12. Thus, the regulator 313 maintains the pressure within the chamber 310 as close to supply tank pressure as is possible. This facilitates maintenance of the liquid petroleum gas primarily in a liquid state for injection by the injector 20. This, together with the cooling of the block 300 by the passage of the liquid petroleum gas through the inlet 301 and the outlet 314, serve to minimise boiling of the liquid petroleum gas in the block 300 so the flow of liquid petroleum gas to the injector 20 and its ejection from the injector 20 is not impaired. However, as noted above, any bubbles or vapor which is caused by boiling of the liquid petroleum gas will flow around the injector 20 to passage 312, and the increase in pressure caused by this vaporisation will open the regulator 313 to allow the vapor and bubble mixture, and therefore the excess pressure to bleed off through the regulator 313 until the pressure drops and allows the regulator 313 to again close.

The pressure on the downstream side of the regulator 313 is considerably less than that in the chamber 310, and the regulator 313 also maintains the low pressure environment on the downstream side so that any liquid petroleum gas which does pass through the regulator 313 can fully vaporise because of the relatively low pressure environment on the downstream side of the regulator 313 compared to the pressure environment within the chamber 310. The passage of the liquid petroleum gas through the outlet 314 and its vaporisation facilitates cooling of the block 300 to, as is noted above, maintain the liquid petroleum gas on the upstream side of the regulator 313, primarily in the liquid state.

As explained with reference to FIGS. 1 to 3, the vapor is supplied to heater 250 through conduit 240 and any liquid petroleum gas which is not already in the vapor state will be vaporised because of the heat supplied to the liquid petroleum gas by the heater 250. The liquid petroleum gas in the vapor state is then supplied to the bleed injector 260 for introduction into the inlet manifold of the engine E.

As shown in FIG. 5, the regulator 313 comprises a plate 340 which is formed with a recess 341. The recess 341 is provided with a peripheral rim 342 which forms a seat. A rubber seal 343 sits on the seat 342. The plate 340 is provided with a shallow groove 344 about the recess 341. A piston 345 is arranged above and connected to the seal 343 and has a screw threaded hole 346. The piston 345 is provided with a passage 347 which communicates the recess 341 with the hole 346.

A diaphragm 348 is arranged in the shallow groove 345 and is held in place by a ring 351 which is L-shaped in cross-section. A retainer 352 is provided within the ring 351 and has a central hole 353. A second diaphragm 381 is provided on top of the retainer 352 and is sandwiched between shoulder 385 of cover cap 363, and the upper periphery 386 of the L-shaped ring 351. The diaphragm 383 is provided with a central hole 387. A screw 354 passes through the 387 in diaphragm 383 and central hole 353 in the diaphragm 348 and screw threads into the screw threaded hole 346 of the piston 345. The screw 345 is provided with a head 355 and the diaphragm 348 is securely sandwiched between the piston 345 and the retainer 352, and base 391 of ring 351 and groove 315. The screw 345 is provided with a central bore 359.

The diaphragms 348 and 383 divide the regulator 313 into a first regulator chamber part 360 which is basically formed by the recess 341 below diaphragm 348, and a second chamber part 362 which is formed between the diaphragm 383 and a cover cap 363.

As is apparent from FIG. 5, the cross-sectional area presented by the seal 343 and diaphragm 348 to the chamber 310 is small (and shown by the arrow X in FIG. 5) compared to the cross-sectional area of the diaphragm 383 in the second chamber part 362 (and which is represented by the double-headed arrow Y in FIG. 5).

When pressure in the chamber 310 builds up, the seal 343 is forced upwardly off seat 342 and vapour and bubble mixture is able to pass into the chamber 341. Movement of the seal 343 is accommodated by the pressure pushing the seal 343 upwardly, which moves piston 344 upwardly and flexes diaphragm 348 upwardly. This in turn pushes the retainer 352 upwardly which flexes the diaphragm 383 upwardly. Thus, as noted above, the pressure in the chamber 310 is able to bleed through the passage 312 over the seat 342 and into the chamber 341, which basically surrounds the piston 344. That vapour mixture can then flow through the bore 347 in the piston 345 and through the bore 359 in the screw 354 into the second chamber part 362. The pressure in the first chamber part 360 and the pressure in the chamber part 362 will be the same, but because the pressure is acting on a relatively greater surface area presented by the diaphragm 383 (as shown by arrow Y) compared to the surface area of seal 343 and diaphragm 348 (shown by arrow X), a downward force will be exerted on the diaphragm 383 and retainer 352 which will overcome the force on the underside of the seal 343 caused by the pressure in the chamber 310. Thus, the retainer 352, the screw 354 and the piston 345 will be pushed downwardly to relocate the seal 343 on the seat 342.

The pressure at which the seal 343 is closed can be selected by selecting the size of the surface area of the diaphragm 383, as shown by arrow Y compared to the size of the seal 343 and diaphragm 348, shown by arrow X so the seal 343 is closed when a predetermined pressure is provided to the chamber 341 and the chamber 362.

When the seal 343 closes on the seat 342, the chambers 341 and 362 are shut off from the high pressure environment in the chamber 310 and because of the low pressure environment, the vapor and bubble mixture (and any liquid which may have passed the seal 343) is able to vaporise and pass out through outlet bore 315 to the heater 250, as previously explained. Thus, the downstream side of the regular 313 is maintained at the relatively low pressure environment to ensure that the bubbles and vapor present in the chamber 310 do escape past the regulator, leaving a liquid environment in the chamber 310 for ejection by the injector 20. The low pressure environment on the downstream side of the regular 313 also facilitates conversion of any liquid and breakdown of bubbles into a vapor state, which breakdown is completed when the liquid petroleum gas reaches the heater 250.

The vapour and bubble mixture which is present in the chamber parts 360 and 362 is able to escape through the outlet bore 315 when the seal 343 is closed by flowing back into the first chamber part 341 through the bore 359 and the bore 347. The bore 315 is restricted so that when the seal 343 is open, the high pressure environment does not immediately bleed through the bore 315, but rather will create the high pressure environment in the second chamber 362 to close the valve 343 before the vapor and bubble mixture completely bleeds through the restricted bore 315.

When the pressure decreases below the threshold pressure, and the pressure in the chamber 310 increases above the threshold pressure, the seal 343 is again lifted from the seat 342 so the vapour and bubble mixture can flow into the regulator chamber part 360. Whilst the outlet bore 315 is always open to the first chamber 341, the flow of vapour and bubble mixture into the chamber 341 and 362 is greater than what exits through the passage 315 so the flow into the chamber part 341 causes the build up of pressure in the chamber 360 and 362 to operate the regulator in the manner described above.

As previously explained, the bore 315 communicates with the labyrinth passage 316 which is provided in the block 300 and presents a relatively large surface area, so the flow of vapour through the labyrinth passage 316 cools the block 300, as does the flow of liquid petroleum gas into the inlet 301. The flow of liquid petroleum gas and vapour/bubble mixture through the block 300 cools the block 300 to minimise the amount of vaporisation of liquid petroleum gas, and the flow of the liquid petroleum gas around the injector 20 cools the injector 20 so liquid petroleum gas will remain in the liquid state within the injector 20 for ejection from the injector 20. Any liquid petroleum gas in the vapour or bubble state which exits through the regulator 313 will be converted to the fully vapour state by the heater 250 for supply to the engine through the bleed injector 260.

Figure 6:
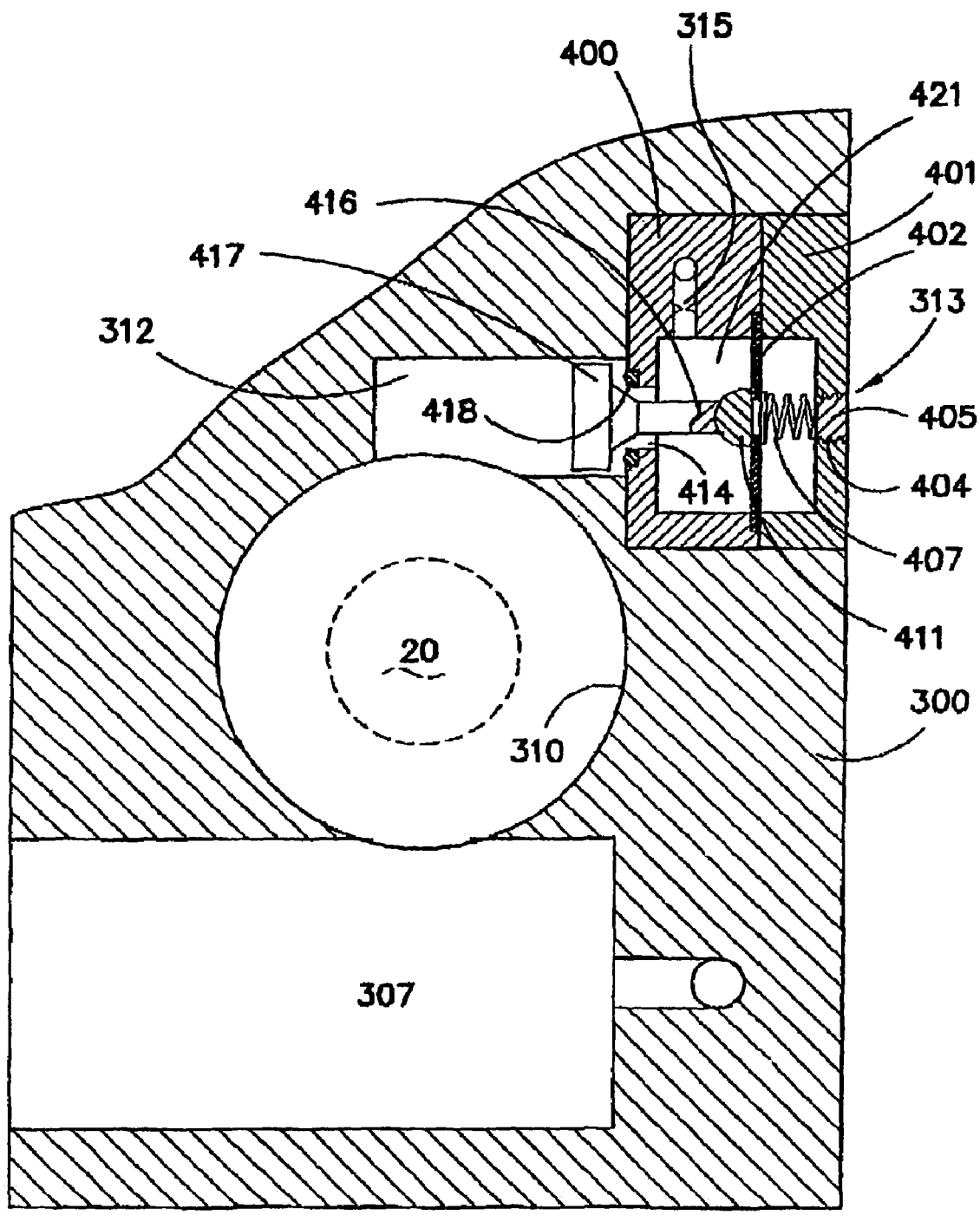
FIG. 6 is a cross-sectional view of a further embodiment of the invention.

FIG. 6 shows another embodiment. In this embodiment, the regulator 313 is mounted on the side of the block 300 so that the block can be made even smaller, which in turn makes cooling of the block 300 and the injector 200 easier. In this embodiment, the filter cavity 307 and the injector chamber 310 are bored at right angles with respect to one another in the block 300 and slightly overlap, so the cavity 307 directly communicates with the chamber 310. The chamber 310 mounts the injector 20 in the same manner as previously described and slowly overlaps outlet bore 312 which leads to the regulator 313.

The regulator 313 comprises a first plate 400 and a second plate 401 which clamp a diaphragm 402. The plate 401 has a screw threaded hole 404 into which a screw threaded stem 405 is located. A spring 406 is provided between the stem 405 and the diaphragm 402. The diaphragm 402 carries a boss 411 opposite the spring 407, and the bias supplied by the spring 407 can be adjusted by screwing the stem 405 into or out of the hole 404.

The plate 400 has an opening 414 and a valve plunger 416 is located in the opening 414. The plunger 416 has a head 417 and the opening 414 carries O-ring 418 against which the head 417 can seal.

The bias supplied by the spring 407 is sufficient to overcome the pressure within the chamber 310, and therefore maintain the plunger 416 in an open position in which the head 417 is away from the O-ring 418 which forms a seat for the head 417. Vapour and bubble mixture is therefore able to bleed from the chamber 310 through the opening 414 and into regulator chamber 421. As the pressure in the chamber 421 increases, the diaphragm 402 is biased away from the plunger 416 so the plunger 416 can be pushed by the pressure in the chamber 310 to close the head 417 against the seat 418. The bubble and vapour mixture within the chamber 421 exits it through outlet bore 315 to the outlet 314 in the same manner as in the previous embodiment for delivery into the bleed injector 260.

Thus, in this embodiment, the high pressure embodiment of the chamber 310 is able to flow into the chamber 421 and when the pressure builds up in the chamber 421, the plunger 416 is closed. This restores the low pressure environment on the downstream side of the regulator and maintains a relatively high pressure environment within the chamber 310. Thus, the vapor and bubble mixture in the chamber 421 is able to convert to vapor state because of the low pressure environment, in the same manner as previously described, and be provided to the bleed injector 260 in the same manner as the previous embodiment.

Thus, in the preferred embodiments of the invention, the regulator can regulate the pressure within the injector chamber so as to maintain that pressure at about the pressure of the liquid petroleum gas which is supplied from the liquid petroleum gas tank. The pressure downstream of the regulator can be reduced significantly and the regulator therefore enables that pressure to drop so the pressure is low enough for liquid petroleum gas which passes through the regulator to completely evaporate. The ability to regulate and fix the pressure downstream of the regulator also fixes the temperature at which evaporation happens (ie., that is, it fixes the refrigeration point of the liquid petroleum gas downstream of the regulator). The ability of the regulator to maintain the pressure downstream at a lower pressure than the pressure in the injection chamber results in a controlled pressure and flow over the vapor bleed 260 in a given period of time (for example, the injector pulse width). Furthermore, maintaining the pressure low downstream of the regulator enables the bleed injector 260 to operate satisfactorily because the pressure does not increase sufficiently high to prevent the valve within the injector 260 from opening. Furthermore, the maintenance of the low pressure downstream of the regulator also enables manifold pressure to be supplied back to the side of the diaphragm 402 opposite the opening 414 so as to balance the pressure within the regulator against manifold pressure of the engine if that is necessary or desirable.

In the claims which follow and in the preceding description of the invention, except where the context requires otherwise due to express language or necessary implication, the word "comprise", or variations such as "comprises" or "comprising", is used in an inclusive sense, ie. to specify the presence of the stated features but not to preclude the presence or addition of further features in various embodiments of the invention.

Since modifications within the spirit and scope of the invention may readily be effected by persons skilled within the art, it is to be understood that this invention is not limited to the particular embodiment described by way of example hereinabove.

The invention claimed is:

1. A fuel delivery system for an engine including:
    a liquid injector for receiving liquid gas and for ejecting liquid gas in liquid form to the cylinders of an engine;
    means for preventing vaporisation or bubbling of the liquid gas in the liquid injector so the liquid gas is ejected from the injector in liquid form;
    collection means for collecting vaporised liquid gas;
    a bleed injector for delivering the collected liquid gas vapour to the cylinder of the engine; and
    wherein the system includes liquid gas supply means for supplying liquid gas for ejection by the injector, the collection means comprises a debubbling chamber in which bubbled or vaporised liquid gas is collected, the injector being located in the chamber so that the collected vapour facilitates cooling of the injector, and a vapour supply line for supplying vapour from the chamber to the bleed injector.

2. The system according to claim 1 wherein the system includes a controller for supplying injection pulses to the liquid injector and injection pulses to the bleed injector so that liquid gas in liquid form and liquid gas in vapour form is supplied only when the inlet valve of the cylinder is open and the exhaust valve of the cylinder is closed.

3. The system according to claim 1 wherein the bleed injector is sized and the injection pulses applied to the bleed injector are of such a length to control the amount of liquid gas in vapour form which is delivered from the bleed injector to the cylinder of the engine.

4. The system according to claim 1 wherein a bleed gas heater is provided for heating the vapour before the vapour is supplied to the bleed injector to ensure that the liquid gas supplied to the bleed injector is supplied in vapour form for ejection by the bleed injector.

5. The system according to claim 4 wherein the bleed gas heater comprises a heater housing for receiving heated fluid, and a bleed line passing through the heater housing for delivering the vapour to the bleed injector.

6. The system according to claim 5 wherein the heated fluid comprises engine cooling water.

7. The system according to claim 2 wherein the controller comprises the engine control unit of the engine which produces injection pulses for delivery to both the liquid injector and the bleed injector in accordance with engine operating conditions.

8. The system according to claim 7 wherein the pulse supplied to the bleed injector is the same width as the pulse supplied to the liquid injector.

9. The system according to claim 1 wherein the collecting means comprises cooling means for cooling the liquid injector to prevent bubbling or vaporisation of the liquid gas when in the injector.

10. The system according to claim 9 wherein the cooling means includes a housing in which the injector is supported, an inlet in the housing for receiving bubbled liquid gas, and for enabling the bubbled liquid gas to surround the injector in the housing to cool the injector to thereby maintain the liquid gas in the injector in a liquid state, outlet means from the housing for supplying vapour from the housing to the bleed injector.

11. The system according to claim 10 wherein the bleed gas heater is arranged between the outlet means from the housing and the bleed injector.

12. The system according to claim 10 wherein the housing includes a pressure regulator for regulating the pressure of the vapour in the housing.

13. The system according to claim 12 wherein the pressure regulator comprises a diaphragm, a valve element supported by the diaphragm for closing the inlet, and biasing means for biasing the diaphragm and the valve element towards a closed position, so that when pressure builds up within the housing, the diaphragm is forced against the bias of the biasing means to move the valve element into a closed position, and when pressure reduces in the housing, the biasing means biases the diaphragm to move the valve element to open the inlet.

14. A fuel delivery system for delivering liquid gas to a cylinder of an engine, comprising:
    a housing;
    a chamber in the housing for receiving an injector which includes a lower opening for enabling liquid gas to be supplied to the injector for ejection from the injector;
    a liquid gas inlet communicating with a lower portion of the chamber for introducing liquid gas into the chamber adjacent the lower portion of the injector when the injector is installed in the chamber;
    an outlet from the chamber arranged in an upper portion of the chamber; and
    a pressure regulator for regulating the pressure of the vapour within the chamber.

15. The system according to claim 14 wherein the housing is in the form of a block and the chamber comprises a bore in the block.

16. The system according to claim 14 wherein the pressure regulator regulates the pressure within the chamber so as to maintain the pressure within the chamber at about the pressure of supply of the liquid gas from a supply tank, and the pressure downstream of the pressure regulator at a relatively low pressure compared to the pressure in the injector chamber.

17. The system according to claim 16 wherein the pressure regulator has an outlet passage which passes through the block in the form of a labyrinth to further facilitate cooling of the block, and therefore the maintenance of liquid gas in the block in a liquid state.

18. The system according to claim 14 wherein the inlet comprises an inlet passage through the block, the inlet passage having a filter cavity for receiving a filter so the liquid gas passes through the filter before delivery to the chamber.

19. The system according to claim 16 wherein the pressure regulator comprises:
   a seat;
   a seal for seating on the seat;
   a piston for moving the seal to sit on the seat;
   a first regulator chamber having a first diaphragm having a first area;
   a second regulator chamber having a second diaphragm having a second area greater than the first area;
   a communication passage for communicating the first chamber with the second chamber; and
   wherein when the pressure in the injector chamber increases to a predetermined amount, the seal is forced away from the seat so vapour and bubble mixture can enter the first chamber and pass into the second chamber through the passage, and because of the differential area between the first diaphragm and the second diaphragm, when the pressure in the first and second chambers reaches a predetermined level, the force on the second diaphragm is greater than the force on the first diaphragm, thereby causing the first and second diaphragms to move to force the piston and therefore the seal against the seat to thereby regulate the pressure in the injector chamber.

20. The system according to claim 19 wherein the first diaphragm is sandwiched between the piston and a retainer, the retainer and piston having a hole for receiving a screw, the second diaphragm being provided on a side of the retainer opposite the first diaphragm, and the communication passage comprising a bore through the piston and a bore through the screw.

21. The system according to claim 19 wherein the pressure regulator comprises:
   a seat;
   a plunger having a head, the head being locatable against the seat, the plunger further having a stem;
   a regulator chamber, a diaphragm forming a wall of the chamber;
   biasing means for biasing the diaphragm so as to push the plunger so the head is away from the seat; and
   wherein when pressure builds up in the injector chamber, the pressure within the injector chamber and regulator chamber forces the diaphragm away from the plunger against the bias of the biasing means so the plunger can be moved so the head seats on the seat.

22. The system according to claim 14 wherein the outlet communicates with the regulator chamber for bleeding vapour and bubble mixture in the chamber out of the regulator chamber, so that when the pressure in the regulator chamber decreases, the biasing means biases the plunger away from the seat so the vapour and bubble mixture in the injector chamber can again enter the regulator chamber to force the diaphragm away from the plunger so the plunger can close to shut off the chamber to thereby regulate the pressure within the injector chamber.

23. The system according to claim 22 wherein the diaphragm includes a boss for engaging the plunger.

24. The system according to claim 21 wherein the biasing means comprises a spring and the spring is connected to a screw threaded stem so that the bias supplied by the spring can be adjusted by screw thread adjustment of the screw threaded stem.

25. The system according to claim 21 wherein the pressure regulator regulates the pressure of the vapor within the chamber and also downstream of the regulator so that the pressure within the chamber is maintained at a relatively high pressure, and the pressure downstream of the regulator is at a relatively low pressure so that vapor and bubble mixture which enters the low pressure environment on the downstream side of the regulator can vaporise for delivery to the engine by a vapor bleed injector.

* * * * *